(12) United States Patent
Xu et al.

(10) Patent No.: US 11,256,292 B2
(45) Date of Patent: Feb. 22, 2022

(54) FOLDABLE MOBILE TERMINAL

(71) Applicants: Beijing BOE Optoelectronics Technology Co., Ltd., Beijing (CN); BOE Technology Group Co., Ltd., Beijing (CN)

(72) Inventors: Shaopeng Xu, Beijing (CN); Hao Wu, Beijing (CN); Xuzhong Liu, Beijing (CN); Na An, Beijing (CN); Xiao Ma, Beijing (CN); Zongwei Luo, Beijing (CN); Gang Ci, Beijing (CN); Baolei Guo, Beijing (CN); Xinfeng Gong, Beijing (CN); Bin Xu, Beijing (CN); Zhenhua Luo, Beijing (CN); Zheng Zhang, Beijing (CN); Qingzhu Guan, Beijing (CN); Wei Su, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 436 days.

(21) Appl. No.: 16/470,375

(22) PCT Filed: Nov. 1, 2018

(86) PCT No.: PCT/CN2018/113513
§ 371 (c)(1),
(2) Date: Jun. 17, 2019

(87) PCT Pub. No.: WO2019/184347
PCT Pub. Date: Oct. 3, 2018

(65) Prior Publication Data
US 2021/0405691 A1   Dec. 30, 2021

(30) Foreign Application Priority Data
Mar. 28, 2018  (CN) .......................... 201810265296.8

(51) Int. Cl.
*G06F 1/16* (2006.01)
(52) U.S. Cl.
CPC .......... *G06F 1/1616* (2013.01); *G06F 1/1641* (2013.01); *G06F 1/1681* (2013.01)
(58) Field of Classification Search
CPC .... G06F 1/1616; G06F 1/1641; G06F 1/1652; G06F 1/1681
See application file for complete search history.

(56) References Cited

U.S. PATENT DOCUMENTS 8,385,055 B2 * 2/2013 Kao ...................... G06F 1/1616
361/679.06
9,064,431 B2 * 6/2015 Ahn .......................... G09F 9/33
(Continued)

FOREIGN PATENT DOCUMENTS

CN   205584268 U   9/2016
CN   205942179 U   2/2017
(Continued)

OTHER PUBLICATIONS

ISR for counterpart PCT/CN2018/113513 dated Jan. 30, 2019.

*Primary Examiner* — Adrian S Wilson
(74) *Attorney, Agent, or Firm* — Arent Fox LLP; Michael Fainberg

(57) ABSTRACT

Disclosed is a foldable mobile terminal including: a flexible panel including a bending section, a first and second flat sections located on two sides of bending section; a first and second support housings, first and second support housings are respectively connected with backsides of first and second flat sections; a multi-rod mechanism located on backside of bending section, connected with first and second support housings, the multi-rod mechanism including support rods arranged in parallel and adjacent to each other, and extending along a bending axis of the bending section, a connection structure arranged corresponding to a same end of two (Continued)

adjacent support rods, the connection structure includes a first bushing pivoted with one of two adjacent support rods, axially limited in position, and a second bushing installed on other support rod of two adjacent support rods, axially limited in position, the first bushing is retractably connected with the second bushing.

14 Claims, 6 Drawing Sheets

(56) References Cited

U.S. PATENT DOCUMENTS

| | | | |
|---|---|---|---|
| 9,625,954 B2* | 4/2017 | Campbell | H04M 1/022 |
| 9,851,759 B2* | 12/2017 | Tazbaz | H04M 1/0216 |
| 9,874,048 B1 | 1/2018 | Hsu | |
| 9,927,845 B1* | 3/2018 | Holung | E05D 11/00 |
| 10,152,094 B1* | 12/2018 | Holung | G06F 1/1616 |
| 10,234,905 B2* | 3/2019 | Chen | H04M 1/0216 |
| 10,871,803 B2* | 12/2020 | Wu | E05D 1/00 |
| 2010/0232100 A1* | 9/2010 | Fukuma | H04M 1/0216 361/679.01 |
| 2013/0014346 A1* | 1/2013 | Ahn | G06F 1/1681 16/354 |
| 2014/0245569 A1* | 9/2014 | Cho | E05D 3/122 16/370 |
| 2015/0362956 A1* | 12/2015 | Tazbaz | G06F 1/1618 361/679.27 |
| 2019/0391615 A1* | 12/2019 | Kee | G06F 1/1652 |

FOREIGN PATENT DOCUMENTS

| | | |
|---|---|---|
| CN | 106601130 A | 4/2017 |
| CN | 206100081 U | 4/2017 |
| CN | 207067960 U | 3/2018 |
| CN | 207910845 U | 9/2018 |

* cited by examiner

FOLDABLE MOBILE TERMINAL

This application is a National Stage of International Application No. PCT/CN2018/113513, filed on Nov. 1, 2018, which claims the priority of Chinese Patent Application No. 201810265296.8, filed with the Chinese Patent Office on Mar. 28, 2018, and entitled "A foldable mobile terminal", both of which are hereby incorporated by reference in their entireties.

FIELD

This disclosure relates to the field of display technologies, and particularly to a foldable mobile terminal.

BACKGROUND

As smart mobile phones and the mobile Internet are advancing rapidly, there is a demand for more than ordinary smart mobile phones. As more advanced hardware components of the mobile phones are configured, and the speed over the Internet is growing, there is a growing demand for larger screens of the mobile phones in that the mobile phones with large screens can significantly improve a user experience and a visual effect, and make it more convenient for their users to operate them while conducting commercial communication, playing game, reading a novel, watching a movie, etc.

SUMMARY

Some embodiments of this disclosure provide a foldable mobile terminal including:

a flexible panel including a bending section, and a first flat section and a second flat section, wherein the first flat section and a second flat section are on two opposite sides of the bending section respectively;

a first support housing and a second support housing, wherein the first support housing is connected with a backside of the first flat section, and the second support housing is connected with a backside of the second flat section; and a multi-rod mechanism located on a backside of the bending section, and connected with the first support housing and the second support housing, wherein the multi-rod mechanism includes a plurality of support rods arranged in parallel and adjacent to each other, and a connection structure arranged corresponding to a same end side of two adjacent support rods; the support rods extend along a bending axis of the bending section, wherein the connection structure includes a first bushing pivoted with one of the two adjacent support rods, and axially limited in position, and a second bushing installed on the other support rod of the two adjacent support rods, and axially limited in position, wherein the first bushing is retractably connected with the second bushing.

For example, the multi-rod mechanism is configured to define an accommodating space for accommodating the bent section, under a condition that the first bushings are rotated relative to the second bushings.

For example, two ends of each of the support rods are provided with axial shoulders configured to axially limit the connection structures in position.

For example, the foldable mobile terminal further includes an elastic damping sheet arranged between an end face of each of the axial shoulders, and a bushing proximate to the each of the axial shoulders.

For example, the first bushing comprises at least one connection rod, and the second bushing comprises a rod hole arranged corresponding to the at least one connection rod; or the second bushing comprises at least one connection rod, and the first bushing comprises a rod hole arranged corresponding to the at least one connection rod, wherein the connection rod is configured to slide and be retracted in the rod hole, and a limiting section is arranged in the rod hole to prevent the connection rod from being separated from the rod hole.

For example, a spacing between the first bushing and the second bushing which are connected with each other is varying under a condition that the first bushing is being rotated relative to the second bushings.

For example, rotation position locking structures are arranged between inner sidewalls of the first bushings, and their corresponding support rods.

For example, the rotation position locking structure comprises a plurality of limiting concavities arranged on the support rod, and a plurality of liming convexities arranged on the inner sidewall of the first bushing in correspondence to the plurality of limiting concavities; or the rotation position locking structure comprises a plurality of limiting concavities arranged on the inner sidewall of the first bushing, and a plurality of liming convexities arranged on the support rod in correspondence to the plurality of limiting concavities, wherein the plurality of liming convexities is configured to be limited in position in the plurality of limiting concavities sequentially.

For example, a first installation indentation is arranged on an end side of the first support housing proximate to the second support housing, and a second installation indentation is arranged on an end side of the second support housing proximate to the first support housing; and one of the support rods of the multi-rod mechanism proximate to the first support housing is a first support rod installed in the first installation indentation, and one of the support rods of the multi-rod mechanism proximate to the second support housing is a second support rod installed in the second installation indentation.

For example, the first bushing and the second bushing are arranged in pair on the support rods in the multi-rod mechanism rather than the first support rod and the second support rod, wherein a stop section is arranged on an end portion of the first bushing proximate to the second bushing, and a blocking section is arranged on an end portion of the second bushing proximate to the first bushing; and the stop section and the blocking section are configured to define a rotation angle of the first bushing relative to the second bushing under a condition that the foldable mobile terminal is being folded.

For example, a quantity of the support rods in the multi-rod mechanism is no less than 5.

For example, the foldable mobile terminal further includes a protective cover plate arranged on a side of the multi-rod mechanism away from the flexible panel.

DETAILED DESCRIPTION OF THE EMBODIMENTS

In order to extend the range of an angle at which a foldable mobile terminal can be folded, to alleviate a flexible panel thereof from being broken, and to prolong the service lifetime of the foldable mobile terminal, some embodiments of this disclosure provides a foldable mobile terminal. In order to make the objects, the technical solutions, and advantages of this disclosure more apparent, this disclosure will be described below in further details in connection with embodiments thereof.

Figure 1:
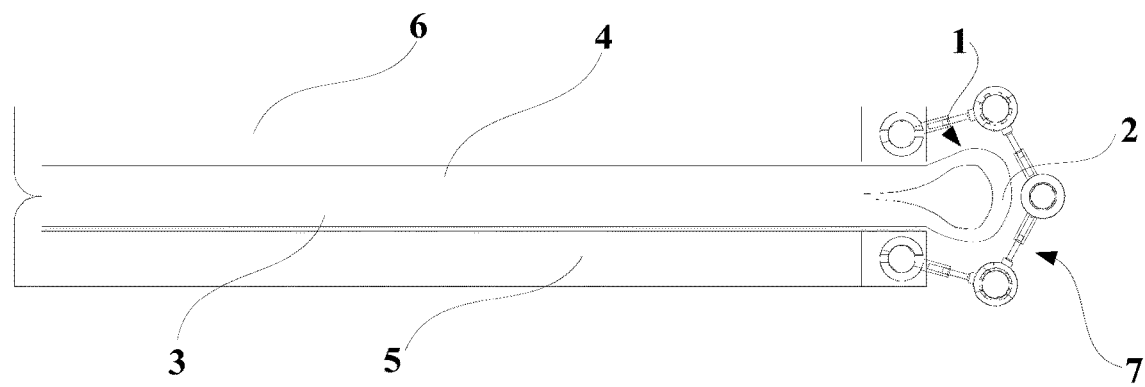
FIG. 1 is a schematic structural diagram of a foldable mobile terminal according to an embodiment of this disclosure.
Figure 2:
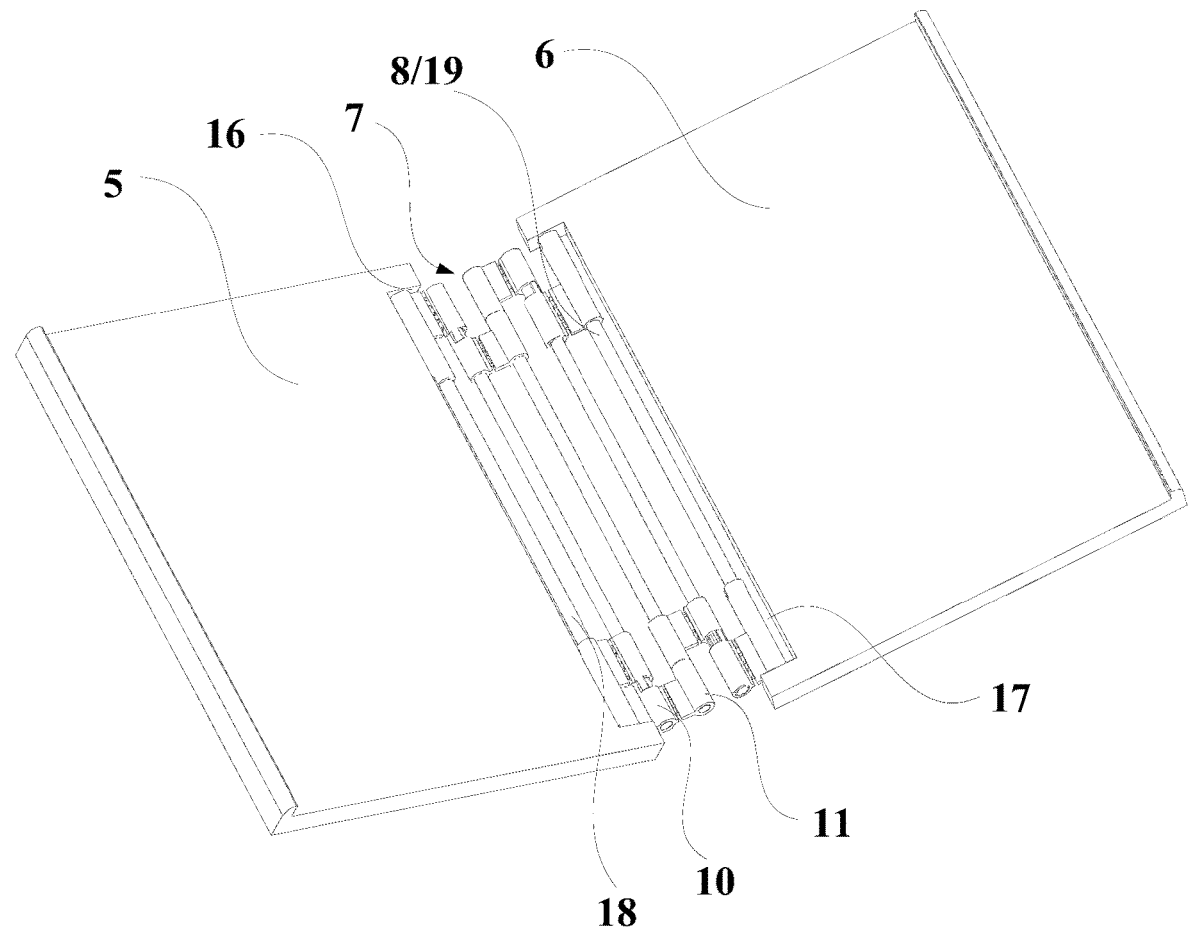
FIG. 2 is a schematic structural diagram of a foldable mobile terminal according to another embodiment of this disclosure.
Figure 3:
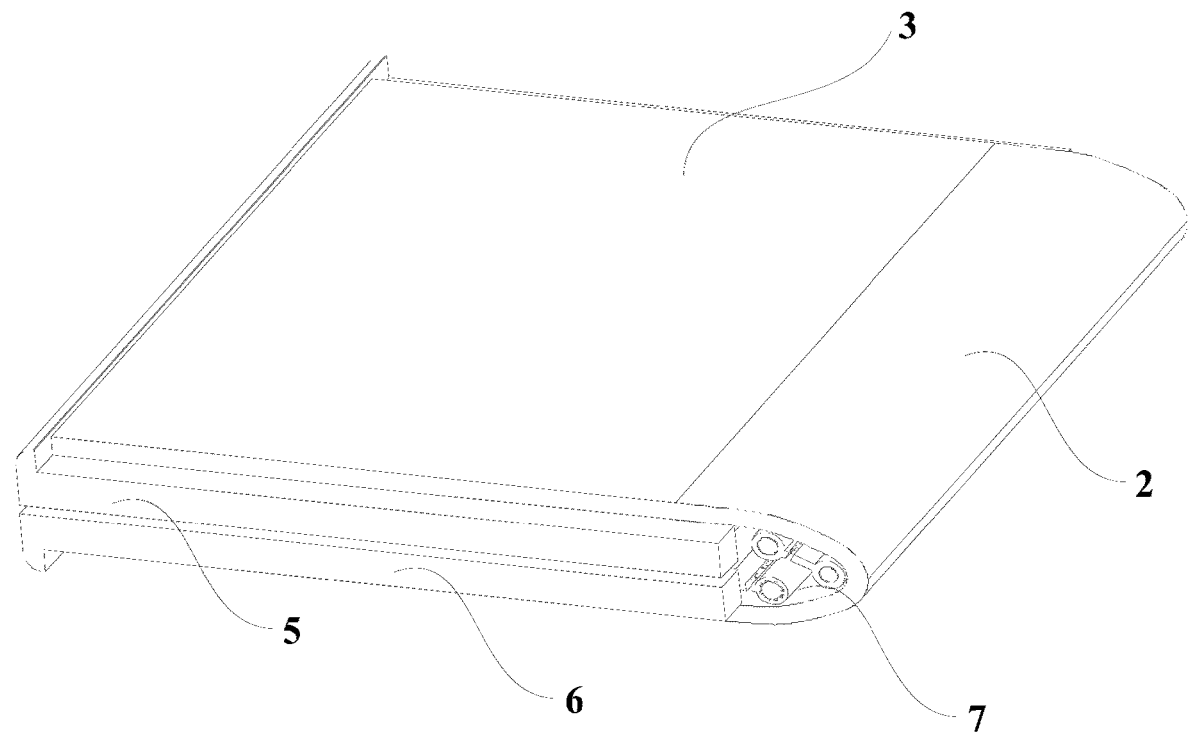
FIG. 3 is a schematic structural diagram of a foldable mobile terminal according to a further embodiment of this disclosure.

As illustrated in FIG. 1 to FIG. 9, where a flexible panel is invisible in a schematic structural diagram of a foldable mobile terminal according to an embodiment of this disclosure as illustrated in FIG. 2, the foldable mobile terminal according to some embodiments of this disclosure includes:

a flexible panel 1 including a bending section 2, and a first flat section 3 and a second flat section 4 located on two sides of the bending section;

a first support housing 5 and a second support housing 6, where the first support housing 5 is connected with the backside of the first flat section 3, and the second support housing 6 is connected with the backside of the second flat section 4; and a multi-rod mechanism 7 located on the backside of the bending section 2, and connected with the first support housing 5 and the second support housing 6, the multi-rod mechanism including a plurality of support rods 8 arranged in parallel and adjacent to each other, and extending along a bending axis of the bending section 2, and a connection structure 9 arranged corresponding to a common end of two adjacent support rods 8, where the connection structure 9 includes a first bushing 10 pivoted with one of the two adjacent support rods, and axially limited in position, and a second bushing 11 installed on the other support rod of the two adjacent support rods, and radially limited in position, where the first bushing 10 is retractably connected with the second bushing 11.

In some embodiments of this disclosure, when the flexible panel is expanded flat for displaying, the side of the flexible panel proximate to a watcher is referred to as a front side of the flexible panel, and the side of the flexible panel away from the watcher is referred to as a backside of the flexible panel.

Here, the number of support rods in the multi-rod mechanism will not be limited to any particular number, but can be particularly determined according to the thickness and the specified size of the foldable mobile terminal.

Figure 4:
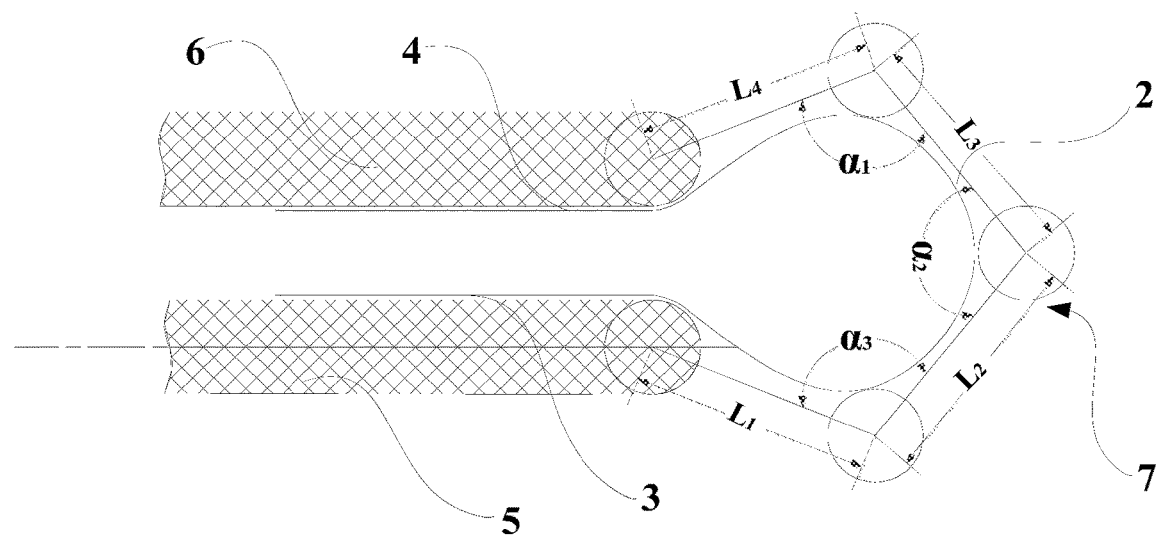
FIG. 4 is a schematic diagram of a foldable mobile terminal according to an embodiment of this disclosure, which is folded, in a sectional view.

As illustrated in FIG. 1 and FIG. 4, when the foldable mobile terminal is folded, the first support housing 5 and the second support housing 6 are stacked over each other, and at this time, a screen of the flexible panel 1 is black, and the mobile terminal is powered off or on standby. When the first bushings 10 are rotated relative to the second bushings 11, the multi-rod mechanism 7 defines an accommodating space in which the bent section 2 of the flexible panel 1 can be accommodated so that the flexible panel 1 can have a large bending radius.

As illustrated in FIG. 4 to FIG. 8, since the support rods of the multi-rod mechanism 7 are connected with each other through the first bushings 10 and the second bushings 11, both of which are retractably connected with each other, the spacing between the first bushings 10 and the second bushings 11, both of which are connected with each other, varies while the mobile terminal is being folded or expanded, so that the foldable mobile terminal can be folded at an angle of 0° to 360°, but also the flexible panel 1 can be significantly alleviated from being broken due to a too large bending angle, thus significantly prolonging the service lifetime of the foldable mobile terminal.

Figure 9:
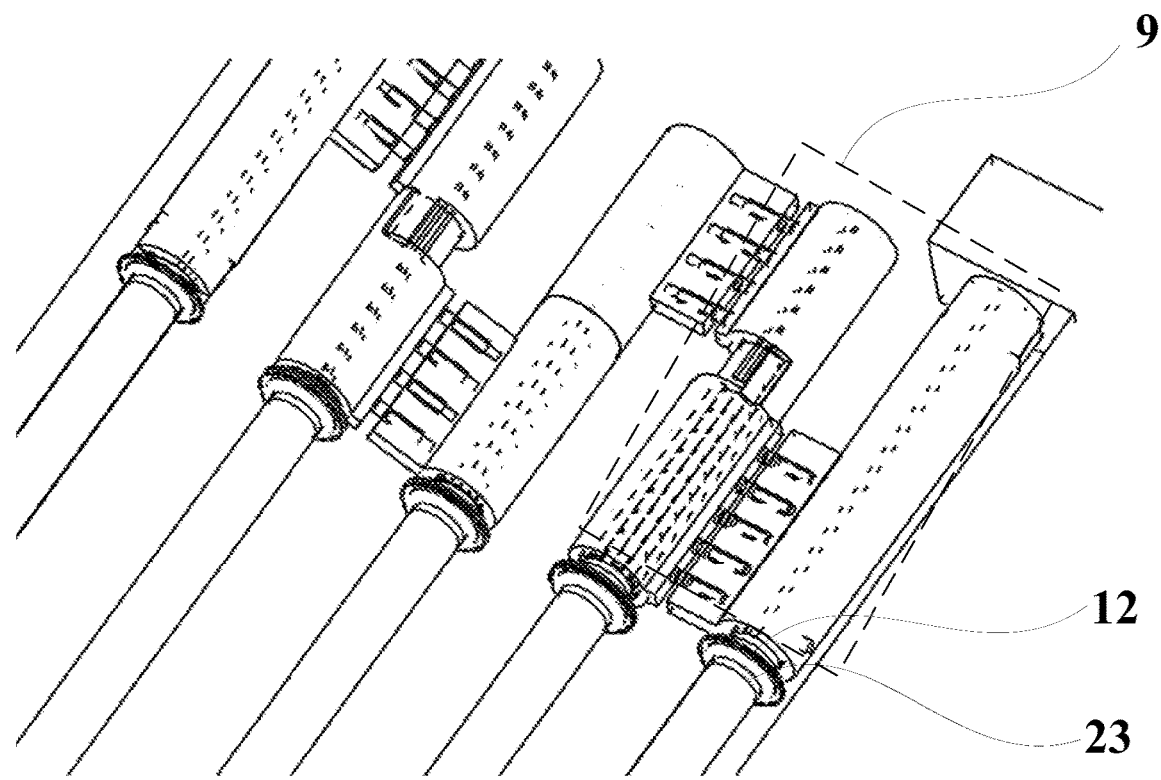
FIG. 9 is a schematic partial structural diagram of a connection structure in a foldable mobile terminal according to an embodiment of this disclosure.

As illustrated in FIG. 9, in some embodiments of this disclosure, there are axial shoulders 23 on two ends of the support rods, where the axial shoulders 23 are configured to axially limit the connection structures 9 in position.

As illustrated in FIG. 9, in some embodiments of this disclosure, the foldable mobile terminal further includes elastic damping sheets 12 arranged between end faces of the axial shoulders 23, and the bushings proximate to the axial shoulders 23. The elastic damping sheets 12 can improve in effect the limiting of axial movement of the bushings to thereby enhance damping forces of the first bushings while being rotated, so that the foldable mobile terminal folded at some angle can firmly remain folded at the angle. The number of elastic damping sheets arranged at each position will not be limited to any particular number, and particularly can be two, so that a rotation damping force of each bushing while being rotated can be adjusted by adjusting the number of elastic damping sheets.

Figure 10:
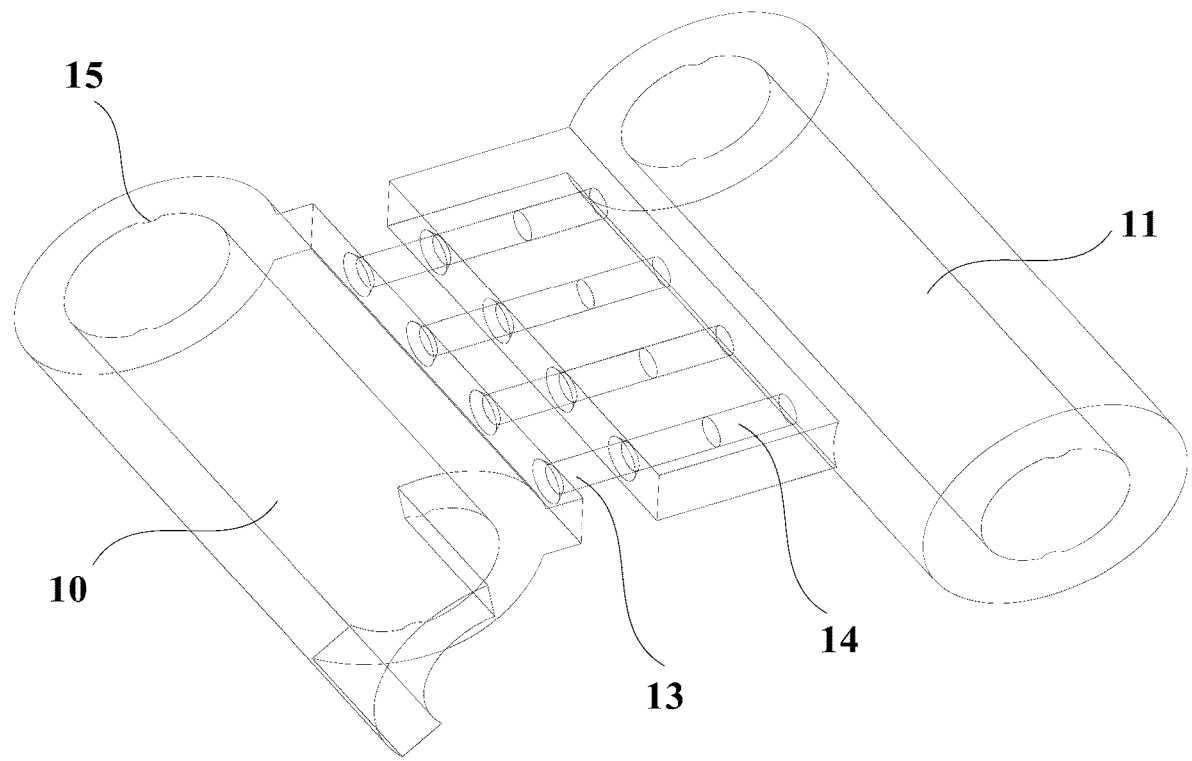
FIG. 10 is a schematic structural diagram of a connection structure according to embodiment of this disclosure.
Figure 11:
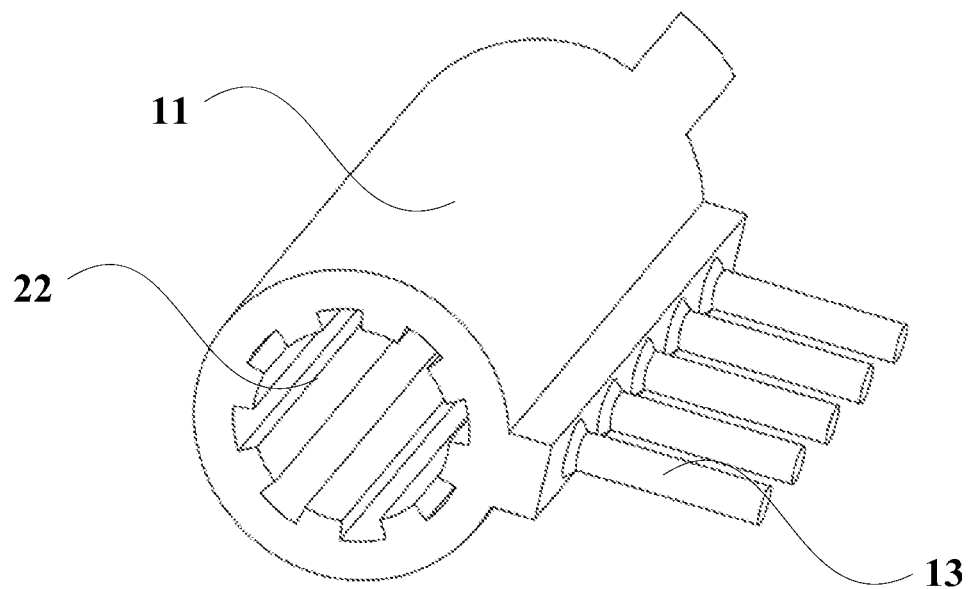
FIG. 11 is a schematic structural diagram of a second bushing according to embodiment of this disclosure.

As illustrated in FIG. 10, in some embodiments of this disclosure, each first bushing 10 includes at least one connection rod 13, and each second bushing 12 includes a rod hole 14 arranged corresponding to the at least one connection rod 13 in a one-to-one manner, where the connection rod 13 can slide and be retracted in the corresponding rod hole 14, and a limiting section (not illustrated) is arranged in the rod hole 14 to prevent the connection rod from falling away. As illustrated in FIG. 11, in some embodiments of this disclosure, the connection rod 13 can alternatively be arranged on each second bushing 11, and the rod hole corresponding to the connection rod 13 in a one-to-one manner can be arranged on the first bushing.

The support rods are connected with each other through the connection rods and their corresponding rod holes on the bushing so that the support rods can be rotated more flexibly, but also the spacing between the adjacent support rods can be adjusted while the foldable mobile terminal is being folded or expanded, to thereby further avoid in effect the flexible panel from being extruded or strained, and thus damaged, and the limiting structures can be arranged for the connection rods, and the rod holes in which they can slide, to thereby avoid in effect the connection rods from falling out of the rod holes while the foldable mobile terminal is being folded, so as to improve the structural stability of the multi-rod mechanism.

In some embodiments of this disclosure, rotation position locking structures are arranged between inner sidewalls of the first bushings, and their corresponding support rods, and as illustrated in FIG. 10, each rotation position locking structure includes a plurality of limiting concavities (not illustrated) arranged on the support rod, and a plurality of liming convexities 15 arranged on the inner sidewall of the first bushing 10 in correspondence to the plurality of limiting concavities, where the plurality of liming convexities 15 can be limited in position in the plurality of limiting concavities in order. In an optional embodiment of this disclosure, alternatively the plurality of liming convexities can be arranged on the support rod, and the plurality of limiting concavities can be arranged on the inner sidewall of the first bushing; and in some embodiments, when the first bushing is rotated by applying a force thereto, the first bushing is rotated relative to the support rod.

A locking force of each rotation position locking structure is related to the number of limiting concavities, the number of liming convexities, and the embedding depth of the limiting convexities into the liming concavities, and different parameters of the limiting concavities and the liming convexities are selected so that the different support rods and bushings can be rotated sequentially in a predetermined order, so when the foldable mobile terminal is set in respective folded states thereof, the multi-rod mechanism is set in an appropriate rotation state; and when the limiting convexities are embedded into the liming concavities, the first bushings can remain stationary relative to the support rods in some range of a torsion force due to a friction force so that the mobile terminal can remain folded at a corresponding angle. Optionally, elastic damping sheets can be further arranged between end faces of the axial shoulders, and the bushings proximate to the axial shoulders to thereby enhance a damping force of the first bushings while being rotated, so as to further improve the stability of some angle at which the foldable mobile terminal is folded.

In embodiments of this disclosure, the second bushings can be connected with the support rods in a number of implementations, and as illustrated in FIG. 11, optionally the second bushings 11 can be splined with the support rods, where internal splines 22 are arranged on the inner sidewalls of the second bushings 11, and corresponding external splines 22 are arranged on the support rods.

As illustrated in FIG. 2, in some embodiments of this disclosure, a first installation indentation 16 is arranged on the end side of the first support housing 5 proximate to the second support housing 6, and a second installation indentation 17 is arranged on the end side of the second support housing 6 proximate to the first support housing 5; and the support rod of the multi-rod mechanism 7 proximate to the first support housing 5 is a first support rod 18 installed in the first installation indentation 16, and the support rod of the multi-rod mechanism 7 proximate to the second support housing 6 is a second support rod 19 installed in the second installation indentation 17, so that the supports and the support housing can be installed conveniently, and the structure of the foldable mobile terminal can be more compact.

Figure 12:
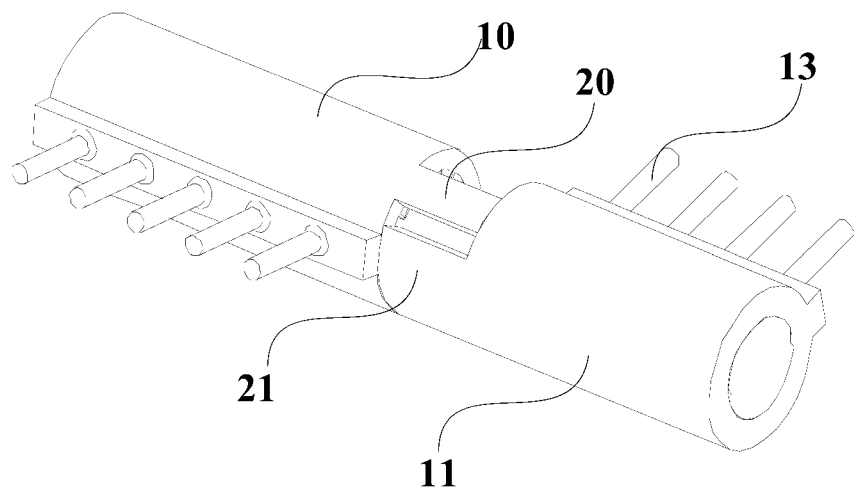
FIG. 12 is a schematic structural diagram of a first bushing and a second bushing according to embodiment of this disclosure.

As illustrated in FIG. 2 and FIG. 12, in some embodiments of this disclosure, the multi-rod mechanism 7 includes the first bushings 10 and the second bushings 11, both of which are arranged in pair, on the other support rods than the first support rod 18 and the second support rod 19, where a stop section 20 is arranged on the end portion of each first bushing 10 proximate to the corresponding second bushing 11, and a blocking section 21 is arranged on the end portion of the second bushing 11 proximate to the first bushing 10; and while the foldable mobile terminal is being folded, the stop section 20 and the blocking section 21 are configured to define a rotation angle of the first bushing 10 relative to the second bushing 11. Optionally, when the central angle of the stop section 20 is $\alpha$, and the central angle of the blocking section 21 is $\beta$, the rotation angle of the first bushing 10 relative to the second bushing 11 ranges from 0 to $180°-\alpha-\beta$, so that the multi-rod mechanism 7 can be avoided in effect from being deformed due to an inappropriate rotation angle while being rotated, to thereby avoid in effect the flexible panel 1 from being deformed.

In some embodiments of this disclosure, the number of support rods in the multi-rod mechanism will not be limited to any particular number, and when the number of support rods in the multi-rod mechanism is no less than 5, the bending radius of the accommodating space defined by the rods being rotated while the foldable mobile terminal is being folded can be increased in effect to thereby improve in effect the smoothness and flexibility of the flexible panel being bent.

In some embodiments of this disclosure, the foldable mobile terminal can further include a protective cover plate arranged on the surface of the multi-rod mechanism away from the flexible panel. In this way, the multi-rod mechanism can be avoided in effect from being exposed directly, and thus damaged, to thereby prolong the service lifetime of the mobile terminal, and to improve the aesthetic degree of the appearance of the mobile terminal.

In some embodiments of this disclosure, as illustrated in FIG. 4 to FIG. 8, the multi-rod mechanism includes five support rods, and FIG. 4 is a schematic structural diagram of the foldable mobile terminal according to embodiments of this disclosure, which is folded, where the screen of the flexible panel is black, the mobile terminal is powered off or on standby, and the state of the five-rod structure is that $L_1=L_4$, $L_2=L_3$, and $\alpha_1=\alpha_3<180°$, where the five-rod mechanism is perfectly rotated due to the rotation position locking structures between $L_1$ and $L_2$, $L_2$ and $L_3$, and $L_3$ and $L_4$, and the bent section 2 of the flexible panel can be accommodated in the accommodating space defined by the multi-rod mechanism 7 which is rotated, to thereby maintain a large bending radius of the flexible panel.

Figure 5:
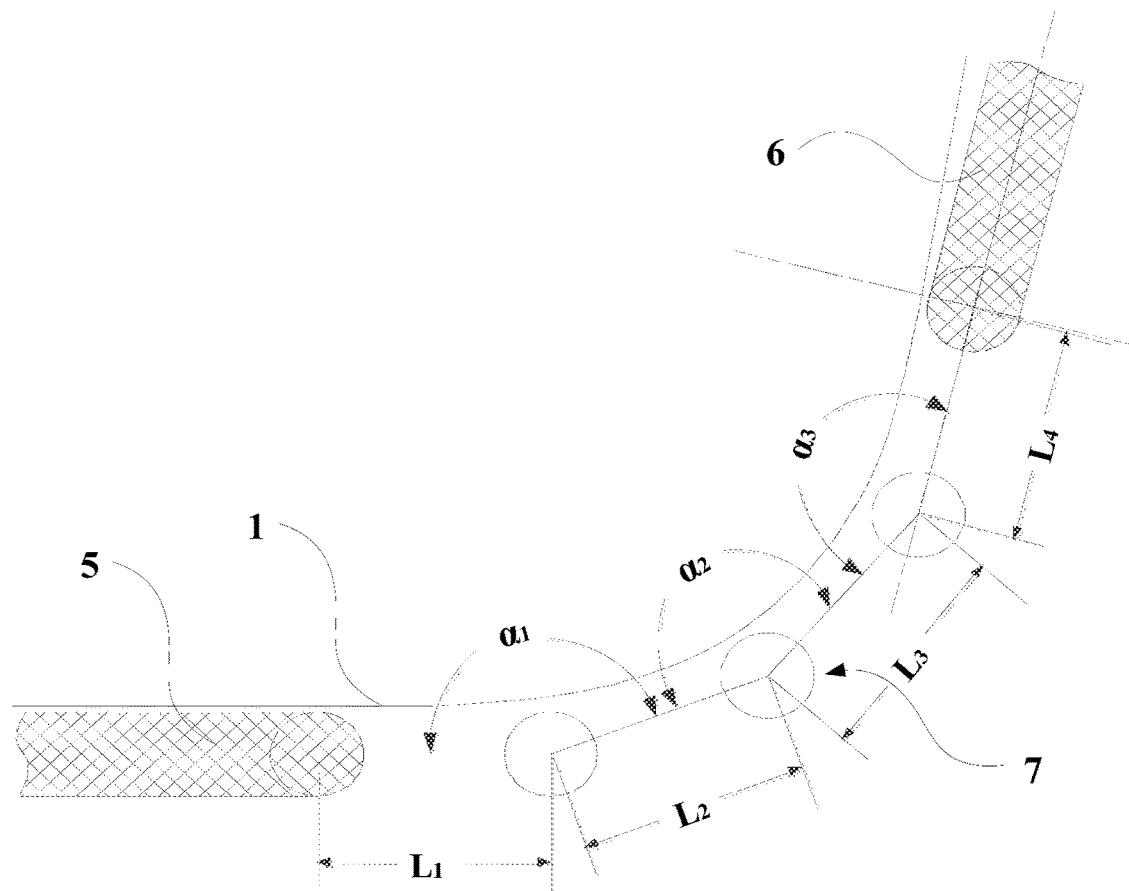
FIG. 5 is a schematic structural diagram of a foldable mobile terminal according to another embodiment of this disclosure, which is expanded at a small angle, in a sectional view.
Figure 6:
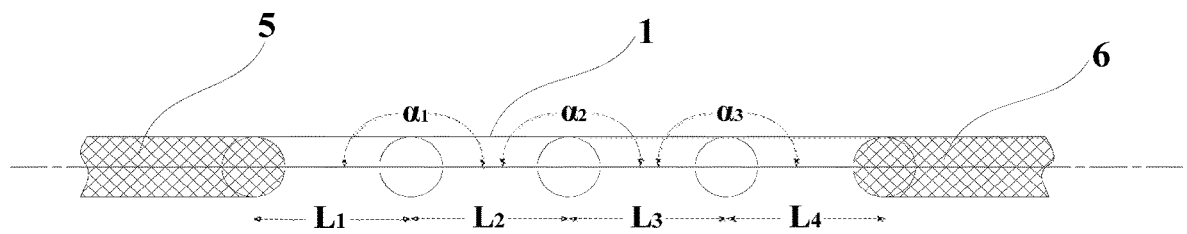
FIG. 6 is a schematic structural diagram of a foldable mobile terminal according to a further embodiment of this disclosure, which is expanded at 180°, in a sectional view.
Figure 7:
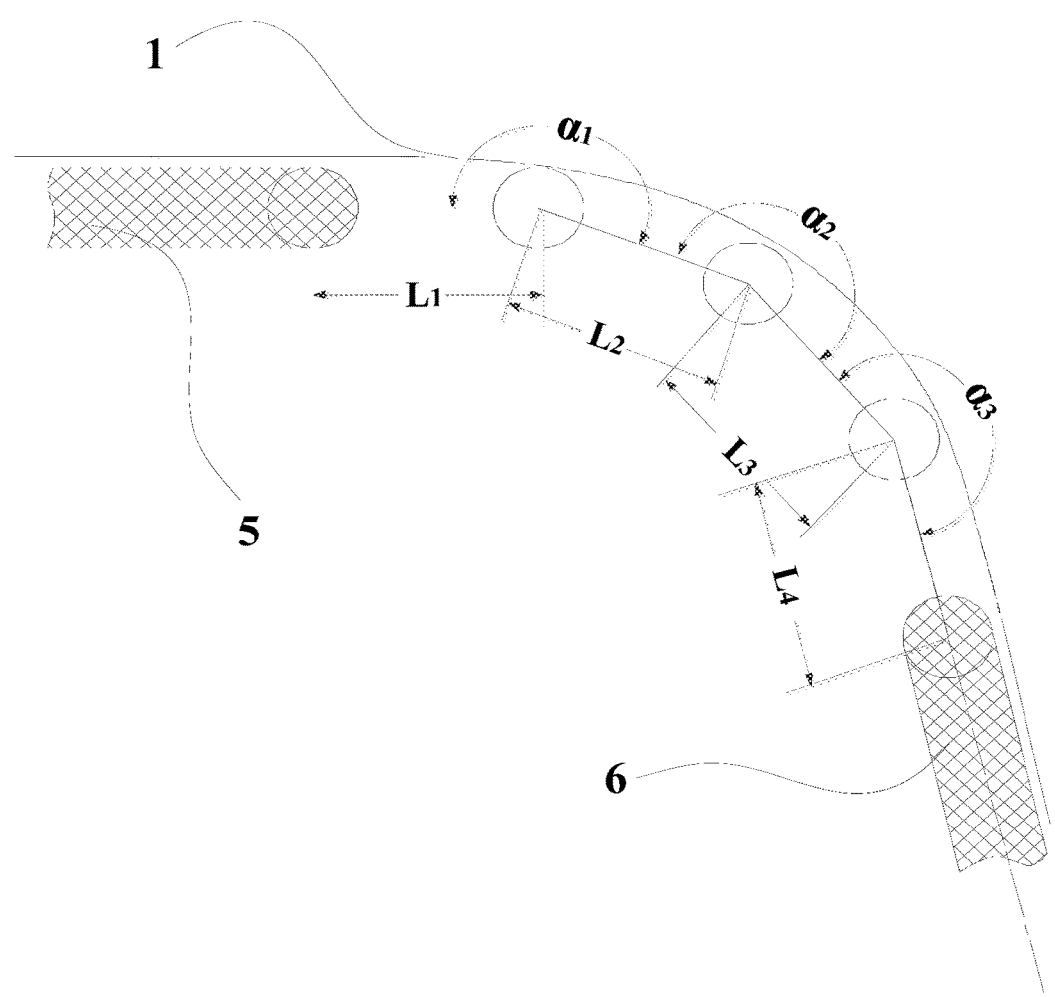
FIG. 7 is a schematic structural diagram of a foldable mobile terminal according to an embodiment of this disclosure, which is expanded at a large angle, in a sectional view.

FIG. 5 is a schematic structural diagram of the foldable mobile terminal according to embodiments of this disclosure, which is expanded at a small angle, where $\alpha_1<180°$, $\alpha_2<180°$, and $\alpha_3<180°$; FIG. 6 is a schematic structural diagram of the foldable mobile terminal according to the embodiment of this disclosure, which is expanded at 180°, where $\alpha_1=\alpha_2=\alpha_3=180°$; and FIG. 7 is a schematic structural diagram of the foldable mobile terminal according to the embodiment of this disclosure, which is expanded at a large angle, where $\alpha_1>180°$, $\alpha_2>180°$, and $\alpha_3>180°$.

Figure 8:
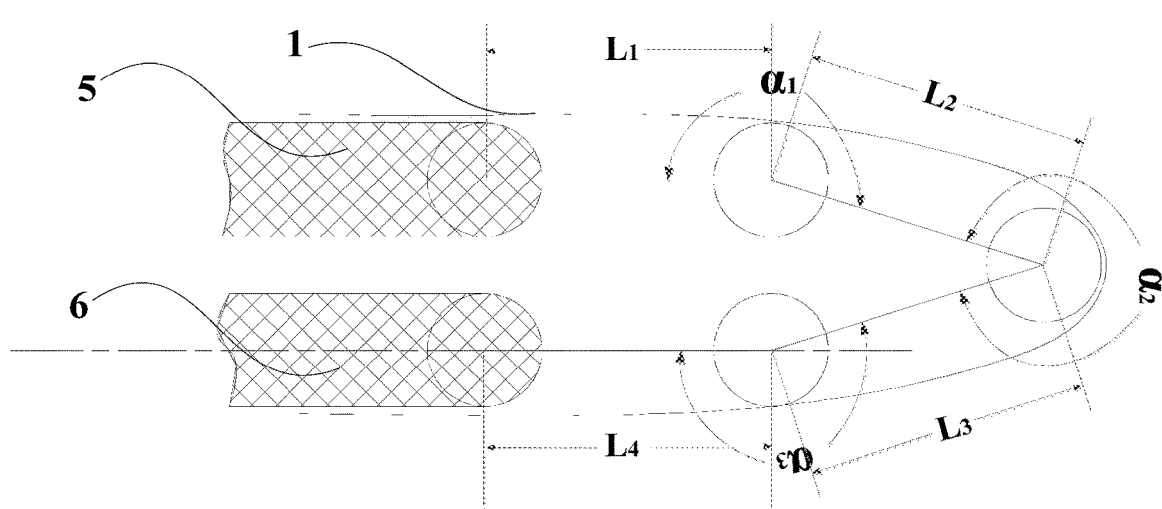
FIG. 8 is a schematic structural diagram of a foldable mobile terminal according to another embodiment of this disclosure, which is folded reversely, in a sectional view.

FIG. 8 is a schematic structural diagram of the foldable mobile terminal according to embodiments of this disclosure, which is folded reversely, where information is displayed on a half or all of the screen of the flexible panel as needed, the foldable mobile terminal is powered on and operating, or on standby, and the state of the five-rod structure is that $L_1=L_4$, $L_2=L_3$, and $\alpha_1=\alpha_3>180°$.

While the foldable mobile terminal is being expanded from the state as illustrated in FIG. 4 to the state as illustrated in FIG. 8, ideally $L_1=L_4$, and $L_2=L_3$, but their lengths are varying all the time, and $\alpha_1$, $\alpha_2$, and $\alpha_3$ are increasing gradually, so that the support housings and the five-rod mechanism can be adapted to the specification of the flexible panel all the time while the flexible panel is being folded, to thereby alleviate in effect the flexible panel from being damaged, so as to prolong the service lifetime of the foldable mobile terminal.

The foldable mobile terminal will not be limited to any particular type, and for example, can be a foldable mobile phone, notebook computer, electronic paper, tablet computer, etc.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A foldable mobile terminal, comprising:
    a flexible panel comprising a bending section, and a first flat section and a second flat section, wherein the first flat section and a second flat section are on two opposite sides of the bending section respectively;
    a first support housing and a second support housing, wherein the first support housing is connected with a backside of the first flat section, and the second support housing is connected with a backside of the second flat section; and
    a multi-rod mechanism located on a backside of the bending section, and connected with the first support housing and the second support housing, wherein the multi-rod mechanism comprises a plurality of support rods arranged in parallel and adjacent to each other, and a connection structure arranged corresponding to a same end side of two adjacent support rods; the support rods extend along a bending axis of the bending section, wherein the connection structure comprises a first bushing pivoted with one of the two adjacent support rods, and axially limited in position, and a second bushing installed on other support rod of the two adjacent support rods, and axially limited in position, wherein the first bushing is retractably connected with the second bushing.

2. The foldable mobile terminal according to claim 1, wherein the multi-rod mechanism is configured to define an accommodating space for accommodating the bent section, under a condition that the first bushings are rotated relative to the second bushings.

3. The foldable mobile terminal according to claim 1, wherein two ends of each of the support rods are provided with axial shoulders configured to axially limit the connection structures in position.

4. The foldable mobile terminal according to claim 3, further comprises an elastic damping sheet arranged between an end face of each of the axial shoulders and a bushing proximate to the each of the axial shoulders.

5. The foldable mobile terminal according to claim 1, wherein the first bushing comprises at least one connection rod, and the second bushing comprises a rod hole arranged corresponding to the at least one connection rod; wherein the connection rod is configured to slide and be retracted in the rod hole, and a limiting section is arranged in the rod hole to prevent the connection rod from being separated from the rod hole.

6. The foldable mobile terminal according to claim 1, wherein a spacing between the first bushing and the second bushing which are connected with each other is varying under a condition that the first bushing is being rotated relative to the second bushings.

7. The foldable mobile terminal according to claim 1, wherein a rotation position locking structure is arranged between an inner sidewall of the first bushing and a corresponding support rod.

8. The foldable mobile terminal according to claim 7, wherein the rotation position locking structure comprises a plurality of limiting concavities arranged on the support rod, and a plurality of liming convexities arranged on the inner sidewall of the first bushing in correspondence to the plurality of limiting concavities; wherein the plurality of liming convexities is configured to be limited in position in the plurality of limiting concavities sequentially.

9. The foldable mobile terminal according to claim 1, wherein a first installation indentation is arranged on an end side of the first support housing proximate to the second support housing, and a second installation indentation is arranged on an end side of the second support housing proximate to the first support housing; and,
    one of the support rods of the multi-rod mechanism proximate to the first support housing is a first support rod installed in the first installation indentation, and one of the support rods of the multi-rod mechanism proximate to the second support housing is a second support rod installed in the second installation indentation.

10. The foldable mobile terminal according to claim 9, wherein the first bushing and the second bushing are arranged in pair on the support rods in the multi-rod mechanism rather than the first support rod and the second support rod; wherein,
    a stop section is arranged on an end portion of the first bushing proximate to the second bushing, and a blocking section is arranged on an end portion of the second bushing proximate to the first bushing; and,
    the stop section and the blocking section are configured to define a rotation angle of the first bushing relative to the second bushing under a condition that the foldable mobile terminal is being folded.

11. The foldable mobile terminal according to claim 1, wherein a quantity of the support rods in the multi-rod mechanism is no less than 5.

12. The foldable mobile terminal according to claim 1, further comprises a protective cover plate arranged on a side of the multi-rod mechanism away from the flexible panel.

13. The foldable mobile terminal according to claim 1, wherein the second bushing comprises at least one connection rod, and the first bushing comprises a rod hole arranged corresponding to the at least one connection rod, wherein the connection rod is configured to slide and be retracted in the rod hole, and a limiting section is arranged in the rod hole to prevent the connection rod from being separated from the rod hole.

14. The foldable mobile terminal according to claim 7, wherein the rotation position locking structure comprises a plurality of limiting concavities arranged on the inner sidewall of the first bushing, and a plurality of liming convexities arranged on the support rod in correspondence to the plurality of limiting concavities, wherein the plurality of liming convexities is configured to be limited in position in the plurality of limiting concavities sequentially.

* * * * *